Patented Jan. 18, 1938

2,105,808

UNITED STATES PATENT OFFICE 2,105,808

VULCANIZATION OF RUBBER

Howard I. Cramer, Cuyahoga Falls, Ohio, assignor to Wingfoot Corporation, Wilmington, Del., a corporation of Delaware No Drawing. Application February 16, 1935, Serial No. 6,836

22 Claims. (Cl. 18—53)

This invention relates to new compositions of matter which have been found to be accelerators of the vulcanization of rubber. More particularly, these new compositions are reaction products of amines containing a hydrogenated furane ring and aldehydes.

Heretofore, various aldehyde-amine reaction products have been found to have accelerating action for the vulcanization of rubber. Among such are various reaction products of butyraldehyde and primary aromatic amines, the reaction products of cyclohexyl amine and aldehydes, reaction products of crotonaldehyde and aniline, and the like.

This invention includes a new class of aldehyde amines which are prepared by reacting a primary or secondary amine containing a hydrogenated furane ring with an aldehyde. It also includes their use as accelerators of the vulcanization of rubber.

In general, the reaction products of this invention are prepared by merely bringing together the aldehyde and the amine. Since in most cases the reaction is exothermic and the aldehydes are relatively volatile, it is desirable to cool the reaction mixture in order to prevent undue loss of the aldehyde. It is frequently desirable, after the aldehyde and amine are mixed together, to heat the mixture to complete the condensation, but this may not be necessary in cases where the heat of reaction has elevated the temperature sufficiently high. The reaction is one of condensation and may be carried out either in the absence of or presence of a condensation agent such as an acid. The water formed during the reaction may be suitably removed by heating in vacuo. The products except for the formaldehyde reaction product which is a solid, are in general heavy viscous liquids which may be easily incorporated in rubber. Generally, it will be found suitable to employ one mol. of aldehyde per one mol. of primary amine or one mol. of aldehyde per two mols of secondary amine. It is understood, however, that these proportions may be varied within wide limits; for example, it is possible to prepare reaction products which are valuable in the vulcanization of rubber from proportions as high as ten mols of certain aldehydes to one mol. of amine or two or three mols of amine to one mol. of aldehyde. When excess aldehyde is used, just what happens is not known. With certain aldehydes it is believed that the aldehyde undergoes polymerization.

Illustrative of the aldehydes which may be employed are butyraldehyde, crotonaldehyde, aldol, alpha ethyl beta propyl acrolein, isobutyraldehyde, formaldehyde, acetaldehyde, heptaldehyde, benzaldehyde, isovaleraldehyde, isocapronic aldehyde, citral, furfural, alpha methyl beta ethyl acrolein, propionaldehyde, hydroxy naphthaldehyde, tetrahydro furfuraldehyde, valeric aldehyde, lauryl aldehyde, oleic aldehyde, palmitic aldehyde, the toluic aldehydes and cinnamic aldehyde. While the aliphatic aldehydes will generally be found preferable, it will be understood that the aromatic aldehydes may also be used in the practice of the invention.

The primary and secondary amines employed in the practice of the invention are generally and most easily prepared by hydrogenation processes and are those amines in which the double bonds of the furane ring are saturated, fully or partially. While the tetrahydro furfuryl amines are preferred, it will be understood that the invention extends to the partially saturated amines, such as the dihydro furyl or furfuryl amines which, while not generally preparable by hydrogenation processes, may be obtained by synthesis. For the purposes of simplicity the term amines containing a hydrogenated furane ring is used herein to include those primary and secondary amines containing a fully or partially saturated furane ring, however prepared.

The amines reactive with the aldehydes hereinbefore set forth may be represented by the general formula

wherein R is a group containing a hydrogenated furane ring, such as, for example, the tetrahydro alpha furfuryl group; and R' is a monovalent radical such as hydrogen, or alkyl, alicyclic, or aralkyl group or a group containing a furane or hydrogenated furane ring. In general, any primary or secondary amine containing a hydrogenated furane ring in which aliphatic characteristics predominate may be employed in the practice of the invention. A more specific formula representing a preferred class of the amines is the following:

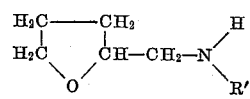

wherein R' represents the same groups expressed above.

Illustrative of these primary and secondary amines are the primary amines such as tetrahydro alpha furfuryl amine, tetrahydro beta furfuryl amine, tetrahydro alpha furyl amine and tetrahydro beta furyl amine. Examples of secondary amines are ditetrahydro alpha- and beta-furfuryl amines, N-tetrahydro alpha furfuryl alpha furfuryl amine, N-ethyl tetrahydro alpha- and beta-furfuryl amines, N-cyclohexyl tetrahydro alpha- and beta-furfuryl amines, N-benzyl tetrahydro alpha- and beta-furfuryl amines, ditetrahydro alpha- and beta-furyl amines, di(2-tetrahydro, alpha or beta, furyl ethyl) amines, N-morpholyl tetrahydro alpha furfuryl amine, N-methyl tetrahydro alpha furfuryl amine, N-ethyl tetrahydro alpha furfuryl amine, N-isobutyl tetrahydro alpha furfuryl amine, N-isoamyl tetrahydro alpha furfuryl amine, N-n-butyl tetrahydro alpha furfuryl amine, N-beta phenyl ethylene tetrahydro alpha furfuryl amine, and the N-hexahydro tolyl tetrahydro alpha- and beta-furfuryl amines.

Illustrative of the preparation of the products of the invention is that of the reaction product of ditetrahydro alpha furfuryl amine and butyraldehyde. This product is prepared by reacting on a steam bath 92.5 grams (.5 mol.) of ditetrahydro alpha furfuryl amine, boiling point 105–110° C. at 1–2 mm., with 20 grams (0.25 mol.+ 10% excess) of redistilled n-butyraldehyde for a period of one hour. The resulting water and excess aldehyde were then removed in vacuo, also on the steam bath. The residual product was a straw colored oil and was obtained in a yield of 107 grams, a 97% yield.

The reaction product of aldol and monotetrahydro alpha furfuryl amine was prepared by adding 32.3 grams of aldol to 35 grams of tetrahydro alpha furfuryl amine. Considerable heat was given off during the addition. The resulting solution was then refluxed for 15 minutes after which the water was distilled off by heating slowly to 140° C. The resulting residue was a dark viscous oil in the amount of 52.3 grams, practically a quantitative yield.

Other products illustrative of the invention are the reaction product of monotetrahydro alpha furfuryl amine and crotonaldehyde, a viscous red liquid; the reaction product of monotetrahydro alpha furfuryl amine and isobutyraldehyde, a straw colored liquid; and the reaction product of ditetrahydro alpha furfuryl amine and crotonaldehyde, a dark viscous liquid. Each of these products was obtained in a practically quantitative yield which is indicative that the products are fairly definite compounds. However, their exact constitution is not known.

Conveniently, any of these new compositions or a mixture thereof may be added to any of the ordinary rubber mixes in an amount which may be determined according to the usual methods. One formula in which the new accelerators have been found effective is as follows:

| | Parts by weight |
|---|---|
| Extracted pale crepe rubber | 100 |
| Zinc oxide | 5 |
| Sulphur | 3 |
| Stearic acid | 1.5 |
| Accelerator | 0.5 |

Samples of the compounded rubber made up in accordance with the formula were subjected to vulcanization by steam heating in a mold after which they were tested to ascertain their elasticity and tensile strength. The results are as follows:

| Cure in mins. at °F. | Ult. tens. kgs/cm² | Max. elong. in percent | Modulus in kgs/cm² | |
|---|---|---|---|---|
| | | | 500 % | 700% |

*Reaction product of mono tetrahydro alpha furfuryl amine and aldol*

| 20/260 | 100 | 875 | 12 | 38 |
| 30 | 124 | 850 | 15 | 51 |
| 40 | 137 | 825 | 18 | 66 |
| 60 | 157 | 790 | 22 | 90 |
| 80 | 156 | 750 | 27 | 110 |

*Reaction product of mono tetrahydro alpha furfuryl amine and crotonaldehyde*

| 20/260 | 112 | 900 | 12 | 37 |
| 30 | 120 | 850 | 15 | 50 |
| 40 | 132 | 830 | 16 | 60 |
| 60 | 160 | 780 | 23 | 98 |
| 80 | 150 | 720 | 34 | 135 |

*Reaction product of mono tetrahydro alpha furfuryl amine and isobutyraldehyde*

| 20/260 | 12 | 790 | 5 | 9 |
| 40 | 49 | 800 | 11 | 28 |
| 60 | 90 | 910 | 12 | 31 |
| 80 | 91 | 850 | 14 | 38 |

*Reaction product of ditetrahydro alpha furfuryl amine and butyraldehyde*

| 20/285 | 50 | 880 | 9 | 20 |
| 40 | 99 | 870 | 14 | 39 |
| 60 | 118 | 830 | 17 | 55 |
| 80 | 128 | 780 | 22 | 73 |

*Reaction product of ditetrahydro alpha furfuryl amine and crotonaldehyde*

| 20/285 | 60 | 915 | 9 | 20 |
| 40 | 100 | 830 | 16 | 48 |
| 60 | 130 | 825 | 19 | 63 |
| 80 | 120 | 780 | 22 | 74 |

It will be apparent from the preceding tables that the use of these compounds results in excellent cures at comparatively low temperatures, the physical qualities of the vulcanized products varying somewhat according to the hydrogenated furyl amine-aldehyde reaction product employed.

It will be understood that by the term "rubber" is meant any of the ordinary forms of rubber such as latex, balata, reclaimed rubber, gutta percha, the ordinary coagulated forms of the *Hevea brasiliensis* tree and mixtures of such materials. It is intended that the patent shall cover, by suitable expression in the appended claims, whatever features of patentable novelty reside in the invention.

What I claim:
1. The process of vulcanizing rubber which comprises subjecting it to vulcanization in the presence of the reaction product of a hydrogenated furyl amine and an aldehyde.
2. The process of vulcanizing rubber which comprises subjecting it to vulcanization in the presence of the reaction product of a tetrahydro alpha furfuryl amine and an aldehyde.
3. The process of vulcanizing rubber which comprises subjecting it to vulcanization in the presence of the reaction product of monotetrahydro alpha furfuryl amine and an aldehyde.
4. The process of vulcanizing rubber which comprises subjecting it to vulcanization in the presence of the reaction product of ditetrahydro alpha furfuryl amine and an aldehyde.

5. The process of vulcanizing rubber which comprises subjecting it to vulcanization in the presence of the reaction product of a tetrahydro alpha furfuryl secondary amine and an aldehyde.

6. The process of vulcanizing rubber which comprises subjecting it to vulcanization in the presence of the reaction product of monotetrahydro alpha furfuryl amine and crotonaldehyde.

7. The process of vulcanizing rubber which comprises subjecting it to vulcanization in the presence of the reaction product of ditetrahydro alpha furfuryl amine and crotonaldehyde.

8. The process of vulcanizing rubber which comprises subjecting it to vulcanization in the presence of the reaction product of a tetrahydro furfuryl amine and an aliphatic aldehyde.

9. A rubber product which has been vulcanized in the presence of the reaction product of a hydrogenated furyl amine and an aldehyde.

10. A rubber product which has been vulcanized in the presence of the reaction product of a tetrahydro alpha furfuryl amine and an aldehyde.

11. A rubber product which has been vulcanized in the presence of the reaction product of monotetrahydro alpha furfuryl amine and an aldehyde.

12. A rubber product which has been vulcanized in the presence of the reaction product of ditetrahydro alpha furfuryl amine and an aldehyde.

13. A rubber product which has been vulcanized in the presence of the reaction product of a tetrahydro alpha furfuryl secondary amine and an aldehyde.

14. A rubber product which has been vulcanized in the presence of the reaction product of monotetrahydro alpha furfuryl amine and crotonaldehyde.

15. A rubber product which has been vulcanized in the presence of the reaction product of ditetrahydro alpha furfuryl amine and crotonaldehyde.

16. A rubber product which has been vulcanized in the presence of the reaction product of a tetrahydro furfuryl amine and an aliphatic aldehyde.

17. The reaction product of a hydrogenated furyl amine and an aldehyde.

18. The reaction product of a secondary tetrahydro alpha furfuryl amine and an aliphatic aldehyde.

19. The reaction product of monotetrahydro alpha furfuryl amine and crotonaldehyde.

20. The reaction product of ditetrahydro alpha furfuryl amine and an aliphatic aldehyde.

21. The process of treating rubber which comprises vulcanizing in the presence of the reaction product of an aldehyde and an amine selected from the group consisting of the primary and secondary hydrogenated furyl amines, hydrogenated furfuryl amines and hydrogenated 2-furyl ethyl amines.

22. The reaction products of an aldehyde and an amine selected from the group consisting of the primary and secondary hydrogenated furyl amines, hydrogenated furfuryl amines and hydrogenated 2-furyl ethyl amines.

HOWARD I. CRAMER.